United States Patent Office 3,214,404
Patented Oct. 26, 1965

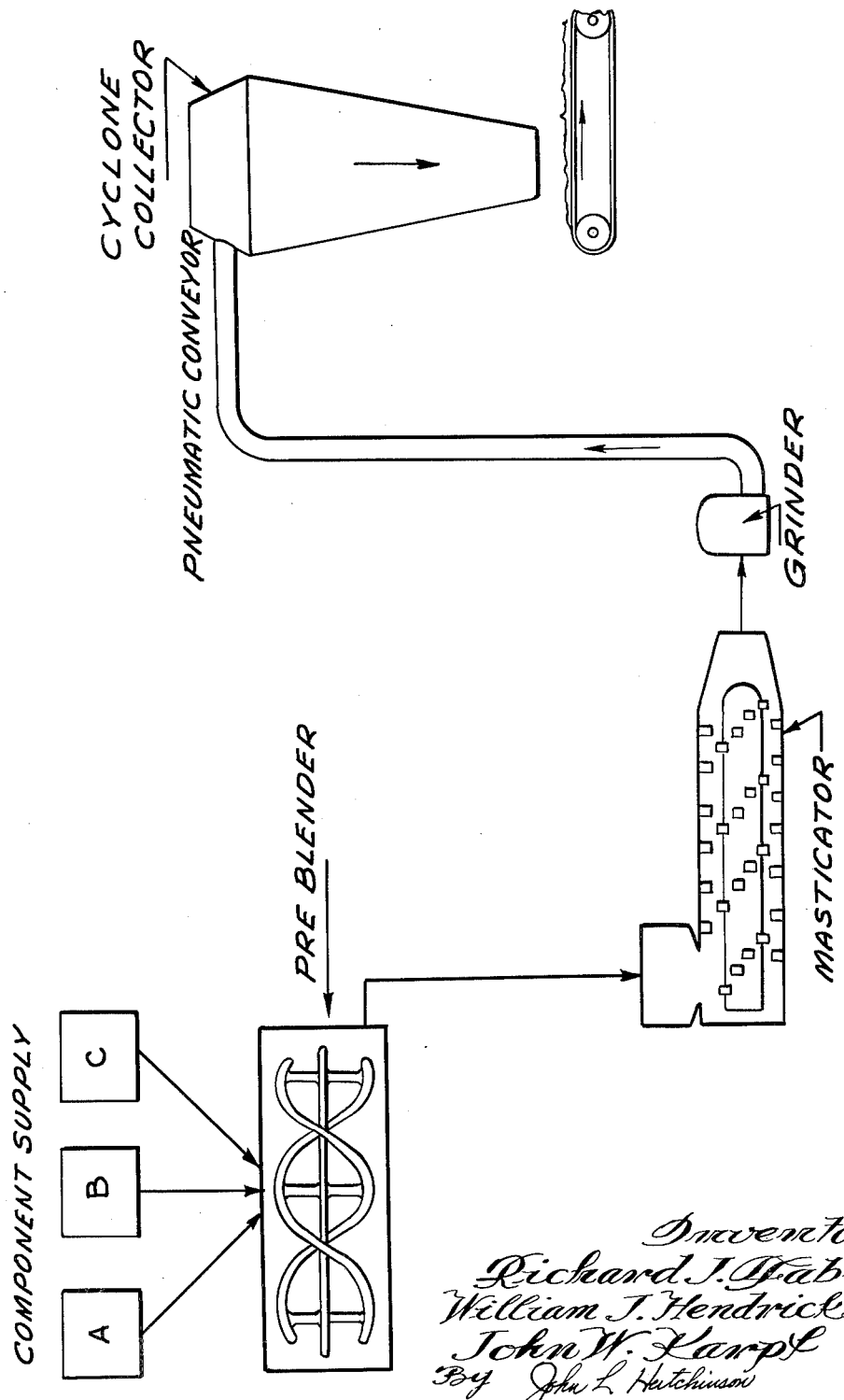

3,214,404
PROCESS FOR PREPARING A RUBBER
MOLDING COMPOSITION
Richard J. Fabry, Mount Prospect, and John W. Karpf, Oak Park, Ill., and William J. Hendrickson, Mooresville, Ind., assignors to The Richardson Company, Melrose Park, Ill., a corporation of Ohio
Filed May 31, 1960, Ser. No. 33,039
7 Claims. (Cl. 260—41.5)

This invention relates to the preparation of rubber molding compositions and, more particularly, to an improved process for compounding the components of such compositions to form a homogeneous dispersion.

The usual mthods employed for preparing rubber molding compositions included the use of heavy duty mixers, such as a Banbury mixer or a conventional rubber mill. A Banbury mixer, in particular, has a number of disadvantages in that it normally involves working large batches of material, thereby resulting in the accumulation of a relatively high heat content within parts of the composition and, correspondingly, increasing the tendency of the composition to "scorch" or pre-cure. Frequently, it is the practice to compound rubber compositions initially in a Banbury, followed by working the compositions on a mill to further disperse the components into a more uniform mass, generally without the addition of accelerators. Slabs of the composition are removed from the mill and then placed on a cooling table to reduce the temperature of the composition prior to adding additional ingredients, such as the aforementioned accelerators. If accelerators were added to the stock while at the elevated temperatures resulting from the aforementioned compounding steps, there would be an even greater tendency for scorching or precuring.

Further, the use of a Banbury mixer in rubber compounding processes heretofore employed has an additional disadvantage in that such processes are substantially a batch operation and result in additional time-consuming steps of loading and unloading the Banbury, cooling and subsequent milling. Mixing procedures using only a mill require considerable experience on the part of the operator and, generally, are considered to be slow and inefficient for large scale operations.

An improvement over the prior art is disclosed and claimed in the patent to Bateman et al. 2,844,327. The process of this patent incorporates a number of modifications which eliminate, to a large extent, the problems of scorching or pre-curing commonly found in prior practices and, in addition, provides for what might be considered a relatively continuous process of rubber compounding as compared to prior art practices. For example, the Bateman et al. process contemplates discharging the contents of a Banbury immediately into a grinder, such as a Sprout-Waldron "hog," wherein the pre-mixed batch is rapidly reduced to a relatively small particle size. These particles are then introduced directly into a pneumatic conveyer and conveyed to a cyclone collector. The pneumatic conveyer and cyclone collector serve to rapidly cool the particles and, accordingly, appreciably reduce the tendency of a composition to scorch or pre-cure. Further working may be performed on the cooled comminuted composition by mills or the like.

While the Bateman et al. process constitutes a marked improvement over the prior art of rubber compounding, it has not completely solved all of the problems which are inherent in using a Banbury or batch type of mixer. Additionally, the costs for installation of such equipment are relatively high.

Accordingly, it is one of the objects of this invention to provide an improved process for compounding rubber compositions to form a more homogeneous and intimate mixture of components.

Another object is the provision of the process which permits more adequate control over the compounding of components forming a particular composition.

Another object is to provide a process of the foregoing type which is substantially continuous and which appreciably reduces the cost required for rubber compounding.

These and other objects will become more apparent from the following specification and the attached drawing.

The drawing represents a diagrammatic plan of an apparatus arrangement which may be used in the present process.

As indicated, the present process is primarily concerned with intimately blending and forming a homogeneous mixture of the various components incorporated in a rubber molding composition. The term "rubber," as used herein, is considered to include both natural and synthetic rubbers or elastomers, such as butadiene-styrene copolymers, chloroprene, butadiene-acrylonitrile copolymers and natural rubber. Of primary interest are those rubbers which are capable of being vulcanized by sulfur. Various rubber compositions and components are disclosed in the publication "Synthetic Rubber," Whitby, Copyright 1954. Normally, rubber compositions will contain, by weight, between 10–75 percent rubber as the principal binder, with the remainder of the composition being made up in varying amounts of sulfur or similar vulcanizing agents, accelerators, carbon black, or similar fillers and other common ingredients, as is indicated in the Whitby publication. Both soft and hard rubber molding compositions may be compounded in accordance with the process of the present invention. Soft rubber compositions usually contain sulfur within the range of between about 0.5 to 5 percent by weight, based on the weight of the rubber component; whereas, hard rubber compositions contain about 15–35 percent sulfur, based on the weight of the rubber component.

In brief, the present invention contemplates a preliminary blending of the various components comprising a particular composition, introducing the pre-blended composition into an extruder-type masticator, and finally comminuting the homogenized composition discharged from the masticator into small particles which are rapidly cooled.

Others have proposed the use of masticators for compounding rubber compositions, such as are contemplated by the present process and included as a part of the system shown in the drawing. However, as far as is known, such apparatus has not been used as part of a complete commercial process in the manner proposed by the present invention. Examples of masticators which may be used for compounding compositions of one type or another are disclosed in U.S. Patents 2,485,854; 2,744,287 and 2,894,280.

As indicated in the drawing, the various components, supplied from a suitable source, such as A, B and C, are introduced into a pre-blender in desired sequence. The pre-blender serves to initially mix the components as a single, loose mass, but with relatively little work being performed and considerably less than the desired degree of homogeneity. Normally, temperatures involved in the pre-blending stage are a negligible factor due to the lack of real work being performed and, generally, remain within the ambient temperature range. Any suitable mixing equipment capable of accomplishing the described blending may be used, such as the well known ribbon-type mixer illustrated diagrammatically in the drawing. The pre-blended composition is then introduced into a masticator which may be selected from a variety of types available, depending upon the particular composition being formulated and the degree of homogeneity required. At present, it has been found preferable to employ a masticator having a series of independently spaced teeth arranged in a substantially spiral configuration on a rotor and adapted to co-act with associated teeth extending from the walls of the masticator chamber. A masticator of this type has been found to be especially effective in preparing hard rubber molding compositions formed from GR-S (butadiene-styrene copolymers) wherein the rubber comprises between ten to fifteen percent by weight of the composition and the filler ranging up to about 85 percent. However, other masticators, such as are disclosed in the aforementioned patents, may also be used so long as they are capable of intimately mixing and compounding the components to achieve the desired degree of dispersion and homogeneity required for molding and article properties. Due to the action of the masticator, which involves primarily shearing and working of small increments, the components are highly dispersed throughout the composition, thereby improving the moldability of the composition and providing more uniform properties in the final molded articles.

Normally, temperatures within the masticator should be controlled so as to permit adequate working and shearing operations without scorching or pre-curing. Temperature control can be maintained to a large extent by providing external jackets and rotor passages through which a cooling medium may be circulated. Masticator temperatures are usually held between approximately 140° F. to 230° F., particularly for vulcanizable rubber compositions containing GR-S. It has been found with most masticators, including masticators of the type shown in the drawing, that a minimum temperature of about 140° F. is generally required before the various components of a GR-S type of composition, for example, obtain a cohesive characteristic, which is essential in forming an adequate moldable composition. If temperatures above about 230° F. are permitted in the masticator, the composition has a tendency to scorch or pre-cure, thereby rendering the same unusable in a final molding process due to poor mold flow or alternately producing non-uniform properties in the final product.

In some instances, it has been found preferable to use several masticators arranged in series, whereby the material discharged from the first masticator is immediately introduced into a second masticator and then into a third, if, for example, three masticators are used. The use of more than one masticator enables additional control over the compounding operation and, in some instances, results in obtaining a more highly homogenized and refined mix.

Compositions, which have been subjected to the action of a masticator, as contemplated herein, are frequently discharged therefrom in relatively large sizes ranging up to chunks having diameters of about one to three inches, a form which is somewhat cumbersome for further processing or molding. Additionally, the temperature of the chunks discharged from the masticator may well range upwards of about 200–230° F. and, accordingly, if temperature conditions are critical, it is desirable to rapidly reduce the composition temperature in order to avoid pre-curing or scorching. Accordingly, the composition discharged from the masticator may be introduced directly into a grinder or comminuter where the large chunks are reduced to a size wherein the average diameter of the particles is about one-quarter of an inch or less. A typical grinder which may be used is a Sprout-Waldron "hog." The composition, in particle form, is then introduced directly into a pneumatic conveyer and carried to a cyclone collector. The air stream is normally at ambient or room temperature, resulting in a substantial reduction of particle temperature, generally to within the vicinity of ambient temperatures or within about 10° thereof. The cooled composition particles may be discharged from the cyclone collector onto a conveyor, as shown in the drawing, and either stored for future use or transferred to a molding operation for forming into desired articles by heat and pressure.

Experience to date has indicated that, while the various components may be introduced into the pre-blender in any order, there are certain preferred orders of introduction, which appear to materially improve the ultimate homogeneity and dispersion of the components. One preferred method of introducing the components into the pre-blender consists of first introducing the majority of the filler, such as coal dust, followed by adding the dry non-filler components, with the exception of the rubber. Components particularly adaptable for introduction at this stage include sulfur, lime and solid accelerators when used. It has also been found preferable to initially form a blend of the sulfur and a small amount of filler, e.g., coal dust, and subject this preliminary blend to a comminuting operation, such as may be obtained with a Fitzmill. This preliminary blending of sulfur and coal dust substantially reduces the tendency of the sulfur to agglomerate and enables its use in the process as a substantially free-flowing fine powder. After the dry ingredients have been introduced into the pre-blender, the so-called liquid components may then be introduced, such as the processing oils, waxes, amines and liquid accelerators, if used. Liquid components may be added by spray nozzles appropriately disposed in the blender while the previously added components are under continuous agitation. The components are then subject to agitation for several minutes, following which the rubber component may be introduced. Preferably, the rubber component is introduced as particles having an average diameter of about one-eighth of an inch. After adding the rubber, the composition is subjected to further blending, generally, for several minutes before it is ready for introduction into the masticator.

In order to make the process one which is substantially continuous, it has been found preferable, in some instances, to use a "live" storage hopper between the pre-blender and the masticator. This "live" storage hopper should be capable of containing one or more batches of pre-blended composition under continuous but slower agitation as compared to the pre-blender until withdrawn for introduction into the masticator.

As previously indicated, the foregoing process is readily adaptable for the compounding of rubber molding compositions containing various amounts of rubber and affords a highly efficient, relatively low cost, substantially continuous process. It has found particular utility in compounding hard rubber molding compositions containing upwards of 50 to 85 percent by weight of coal dust as a filler and from between 10 to 15 percent of sulfur-vulcanizable rubber, primarily GR-S, wherein such compositions are fast-acting and can be cured in a heated mold within a maximum time of about five minutes.

While the present process has particular utility in preparing fast-acting rubber compositions, it may also be used to similarly prepare slower-acting or non-accelerated compositions, wherein temperatures are of limited importance. In such instances, it may not be necessary to introduce the composition into a pneumatic cooling means. Rather, an appropriate orifice may, for example, be provided at the discharge of the last masticator and, assuming sufficient cohesiveness, the composition discharged from the masticator in a predetermined shape.

Having described certain exemplary embodiments of the invention, the same is intended to be limited only by the scope of the following claims.

We claim:

1. A substantially continuous process of forming a homogeneous rubber composition capable of being vulcanized in a heated mold to form a shaped article having uniform properties which comprises (a) initially blending the components of the composition as a loose intermixed mass at substantially ambient temperature and in the absence of any appreciable work force being applied to said amounts; and (b) subsequently subjecting successive relatively small increments of the pre-blended composition to mastication wherein a shearing and working operation is performed on said small increments at a temperature within the range of between about 140° F. to 230° F. to further disperse the components and form a substantially homogeneous vulcanizable mass.

2. A process as described in claim 1 wherein the homogeneous mass is immediately comminuted into small particles and subjected to the cooling action of an air stream at an appreciably lower temperature than the temperature of said particles.

3. A process as described in claim 1 wherein the composition is composed of both dry and liquid components in addition to the rubber and wherein the dry components are initially mixed separate from the wet components prior to forming the pre-blended composition.

4. A process as described in claim 3 wherein the composition includes sulfur and a finely divided filler and wherein sulfur is added in combination with a part of the filler in the form of a relatively fine dry powdered mixture.

5. A process of preparing a hard rubber molding composition comprising between 50–85 percent by weight of filler, 10–15 percent by weight of rubber and sufficient sulfur to obtain a hard rubber cure, which comprises initially blending all of the components into a loose mass at substantially ambient temperature, and subjecting successive relatively small increments of the pre-blended composition to mastication wherein a shearing and working operation is performed on small increments at a temperature within the range of between about 140° F. to 230° F. to further disperse the components and form a substantially homogeneous vulcanizable mass.

6. A process as described in claim 5 wherein the rubber comprises a copolymer of butadiene and styrene.

7. A process as described in claim 6 wherein the homogenized mass is immediately comminuted into small particles and subjected to the cooling action of an air stream at an appreciably lower temperature than the temperature of said particles.

References Cited by the Examiner
UNITED STATES PATENTS

| | | | |
|---|---|---|---|
| 2,440,299 | 4/48 | Rostler et al. | 260—766 |
| 2,576,444 | 11/51 | Clinefelter | 260—41.5 |
| 2,764,779 | 10/56 | Zona | 260—767 |
| 2,844,327 | 7/58 | Bateman et al. | 241—3 |

MORRIS LIEBMAN, *Primary Examiner.*

DANIEL ARNOLD, WILLIAM H. SHORT, *Examiners.*